United States Patent Office 3,434,472
Patented Mar. 25, 1969

3,434,472
SURGICAL DRESSINGS
Peter Douglas Herniman, Knebworth, and David Austin Lickman, Harlow, England, assignors to T. J. Smith & Nephew Limited, Kingston-upon-Hull, Yorkshire, England
No Drawing. Filed Apr. 5, 1966, Ser. No. 540,223
Claims priority, application Great Britain, Apr. 8, 1965, 15,009/65
Int. Cl. A61l 15/00
U.S. Cl. 128—156                      13 Claims

ABSTRACT OF THE DISCLOSURE

A surgical dressing comprising an absorbent pad having a non-woven net of thermoplastic material arranged over said pad to provide a wound-contacting surface for said dressing, which surface is non-adherent to wounds.

---

This invention relates to surgical dressings and more particularly to surgical dressings having a non-adherent surface.

Non-adherent surgical dressings are known. Generally they comprise a porous non-adherent sheet of a plastics material or a metal bonded to an absorbent pad. The non-adherent sheet is placed against the wound and permits the passage of wound exudate into the absorbent backing but prevents adhesion of the dressing to the wound. Because the dressing does not adhere to the wound it does not interfere with the healing process.

It is an object of the present invention to provide a cheap and effective surgical dressing that will not adhere to a wound.

It is also an object of the present invention to provide a surgical dressing that can be manufactured on existing machines used for the conventional muslin covered surgical dressing.

According to the present invention there is provided a surgical dressing comprising an absorbent pad with a non-woven net of a thermoplastic material arranged over the pad to provide a wound-contacting surface for the dressing, which surface is non-adherent to wounds. Preferably the non-woven net of a thermoplastic material is not adhered to the pad at the wound-contacting surface of the dressing.

In a preferred embodiment there is provided a non-adherent surgical dressing comprising an absorbent pad and a non-woven net of a thermoplastic material, both mounted on a pressure-sensitive adhesive tape, the non-woven net providing a surface for the dressing, which surface is non-adherent to wounds, and being positioned over the pad but so arranged that it is not adhered to the surface of the pad remote from the pressure-sensitive adhesive tape.

Non-woven net used in the surgical dressings of the present invention may be that produced by the process described and claimed in British Patent No. 914,489 and in copending applications Nos. 33,949/63 and 47,397/64.

In general the above patent and patent applications describe the formation of non-woven nets from thermoplastic sheet materials having a regular pattern of embossments or cavities on at least one surface. The method is to stress the sheet material biaxially until an openwork net is produced. Generally the stressing biaxially may be done in the two directions simultaneously or sequentially. British Patent No. 914,489 is, however, limited to sequential stressing of an embossed sheet material in the two directions and British application No. 33,949/63 is limited to simultaneous stressing of an embossed sheet material in the two directions.

Suitable thermoplastic materials used to make the openwork nets include polymers of olefins, particularly of ethylene and propylene, and copolymers of these olefins. High density polyethylene is particularly suitable.

The non-woven net used in the dressings of the present invention is preferably within a small range of thicknesses and is preferably thin or even very thin. For example, the net may have a thickness within the range 0.003 inch to 0.006 inch. The openings therethrough are of small size and at relatively close spaces. For example, they may have a diameter of 0.010 inch and occupy 25% of the total area occupied by the net. In general the size of the openings and their mutual spacings should be such that the wound eschar cannot grow into the openings and yet the openings can permit the maximum possible passage of exudate. Simple experiment will permit the limits of these variables to be calculated.

The absorbent pad may be of any absorbent material known in the dressings art. Examples of such materials include cotton wool, cellulose, rayon wool, lint and cotton gauze.

In one embodiment of the invention a surgical dressing comprises an absorbent pad and a piece of a non-woven net of substantially the same length as the pad but of slightly greater width, the excess width of net being folded around each side of the pad and adhered to the pad along strips at two opposite edges of the pad.

A dressing according to the present invention may also have the net adhered to the pad all round the periphery of the surface of the dressing remote from the wound-contacting surface. Generally this is unnecessary. In addition net may be adhered to the pad at the wound-contacting surface of the dressing. Such adhesion should be such that the porosity of the net and the absorbency of the pad are decreased as little as possible or not at all.

The net may be adhered to the absorbent pad by heat sealing or by the use of any adhesive used in the surgical tapes art. When the net is adhered to the pad at the wound-contacting surface of the dressing heat sealing is useful in that it has but slight effect on the porosity of the net and on the absorbency of the pad. If an adhesive is used to unite the pad and the net at the wound-contacting surface of the dressing then it should be used as sparingly as possible and applied only to the net. Preferably, the holes in the net should be cleared by blowing air through them after the application of the adhesive.

Surgical dressings according to the present invention may be produced in long lengths and portions having a required length may be cut off as desired.

Surgical dressings according to the present invention that are made without pressure-sensitive adhesive mounting may be held in place by a bandage or by a separate pressure-sensitive adhesive tape.

When the dressings comprise an absorbent pad and a non-woven net mounted on a pressure-sensitive adhesive tape the adhesive of the pressure-sensitive adhesive tape may be used to hold the absorbent pad and the non-woven net in their relative positions. For example, net may be adhered to the pressure-sensitive adhesive tape at narrow strips positioned at two opposite edges of the absorbent pad. Alternatively, the non-woven net may be held in position over the absorbent pad by narrow strips at two opposite edges of the net folded around two opposite edges of the pad before the pad, with the net, is adhered to the tape by the surface onto which the narrow strips of net have been folded.

The absorbent pad may be positioned substantially central of the pressure-sensitive adhesive tape, with pressure-sensitive adhesive on all sides of it. Alternatively, the dressings may be produced in long strips. An equally long strip of the net-covered absorbent pad is positioned in an area substantially mid-way between the longitudinal edges of the tape. Using this method portions of a desired length may be cut off as desired.

The absorbent pad of the surgical dressings of the present invention may be of any shape. Such shapes include rectangular, oval and circular. In all cases the net may be folded down over the absorbent pad either at portions of the edges of the pad or all round the periphery of the pad.

Surgical dressings according to the present invention, when mounted on pressure-sensitive adhesive tapes, preferably have the usual outer protective strips which are removable when the dressing is to be applied.

Surgical dressings according to the present invention are cheap to produce and may be manufactured using existing machinery used for making muslin covered surgical dressings.

We claim:

1. A surgical dressing comprising an absorbent pad having a surface containing a non-woven net of a thermoplastic material, said non-woven set (a) being arranged on said surface to provide a wound-contacting surface for the dressing, which wound-contacting surface is nonadherent to wounds, and (b) having been produced by the stressing biaxially of a sheet of thermoplastic material having a regular pattern of embossments on at least one surface thereof.

2. A surgical dressing as claimed in claim 1 in which the non-woven net of a thermoplastic material is not adhered to the absorbent pad at the wound-contacting surface of the dressing.

3. A surgical dressing as claimed in claim 2 that comprises an absorbent pad and a piece of non-woven net of substantially the same length as said pad but of a slightly larger width than said pad, the excess width of net being folded around each side of said pad and adhered to said pad along strips at two opposite edges of the surface of the pad remote from the wound-contacting surface of said dressing.

4. A surgical dressing as claimed in claim 3 in which the thermoplastic material from which the net is made is high density polyethylene.

5. A surgical dressing as claimed in claim 3 in which the absorbent pad is made from a material selected from the group consisting of cotton wool, cellulose, rayon wool, lint and cotton gauze.

6. A surgical dressing comprising
   (A) a pressure sensitive adhesive tape
   (B) an absorbent pad mounted on said pressure-sensitive adhesive tape, the surface of said absorbent pad remote from said pressure sensitive adhesive tape containing
   (C) a non-woven net of a thermoplastic material, said net having been produced by stressing biaxially a sheet of a thermoplastic material having a regular pattern of embossments on at least one surface thereof, said net providing a nonadherent, wound-contacting surface for said surgical dressing and being so arranged as not to adhere to the surface of said absorbent pad remote from said pressure-sensitive adhesive tape.

7. A surgical dressing as claimed in claim 6 in which said net is adhered to said pressure-sensitive adhesive tape at narrow strips positioned at two opposite edges of said absorbent pad.

8. A surgical dressing as claimed in claim 6 in which said absorbent pad is positioned substantially centrally of said pressure-sensitive adhesive tape with pressure sensitive adhesive on all sides of said pad.

9. A surgical dressing as claimed in claim 8 in which said pressure-sensitive adhesive tape is a long strip with a strip of net-covered, absorbent pad positioned in an area substantially mid-way between the longitudinal edges of said strip.

10. A surgical dressing as claimed in claim 6 in which said non-woven net is held in position over said absorbent pad by narrow strips at two opposite edges folded around two opposite edges of said pad before said pad, with said net, is adhered to said pressure-sensitive adhesive tape by the surface onto which said narrow strips of net have been folded.

11. A surgical dressing as claimed in claim 6 in which said non-woven net is made from high density polyethylene.

12. A surgical dressing as claimed in claim 6 in which the absorbent pad is made from a material selected from the group consisting of cotton wool, cellulose, rayon wool, lint and cotton gauze.

13. A surgical dressing as claimed in claim 6 provided with outer protective strips for the pressure-sensitive adhesive, said strips being easily removable when the dressing is required to be used.

References Cited

UNITED STATES PATENTS

| 2,858,830 | 11/1958 | Robins | 128—156 |
| 2,877,765 | 3/1959 | Bunyan | 128—156 |
| 3,307,545 | 3/1967 | Surowitz | 128—156 |
| 3,334,626 | 8/1967 | Schimmel | 128—154 |

ADELE M. EAGER, *Primary Examiner.*

U.S. Cl. X.R.

128—157, 169, 296; 161—91; 206—63.2